United States Patent
Kato et al.

(10) Patent No.: US 10,527,112 B2
(45) Date of Patent: Jan. 7, 2020

(54) DRIVING FORCE TRANSMISSION CONTROL APPARATUS

(71) Applicant: JTEKT CORPORATION, Osaka-shi (JP)

(72) Inventors: Tomoaki Kato, Kariya (JP); Kotaro Sarai, Nishio (JP); Toshimi Hara, Takahama (JP); Naoki Sawada, Handa (JP); Masahito Uesaka, Anjo (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/123,780

(22) Filed: Sep. 6, 2018

(65) Prior Publication Data
US 2019/0072142 A1    Mar. 7, 2019

(30) Foreign Application Priority Data

Sep. 6, 2017 (JP) .................................. 2017-171093

(51) Int. Cl.
| | |
|---|---|
| *F16D 48/06* | (2006.01) |
| *B60K 23/08* | (2006.01) |
| *F16D 13/52* | (2006.01) |
| *F16D 13/74* | (2006.01) |
| *F16D 27/115* | (2006.01) |

(52) U.S. Cl.
CPC ........ *F16D 48/064* (2013.01); *B60K 23/0808* (2013.01); *F16D 13/52* (2013.01); *F16D 13/74* (2013.01); *F16D 27/115* (2013.01); *F16D 2500/1022* (2013.01); *F16D 2500/3022* (2013.01); *F16D 2500/30404* (2013.01); *F16D 2500/30415* (2013.01);

(Continued)

(58) Field of Classification Search
CPC ........ F16D 48/06; F16D 48/064; F16D 13/74; F16D 2500/3022; F16D 2500/30404; F16D 2500/70418; F16D 2500/7061
See application file for complete search history.

(56) References Cited

U.S. PATENT DOCUMENTS

| | | | |
|---|---|---|---|
| 2001/0011625 A1* | 8/2001 | Naito ..................... | F16D 48/06 192/70.252 |
| 2008/0277224 A1* | 11/2008 | Kiessner-Haiden ........................ | F16D 48/064 192/3.22 |
| 2014/0214294 A1* | 7/2014 | Mori ................... | F16H 61/0437 701/60 |

FOREIGN PATENT DOCUMENTS

JP    2007-64251    3/2007

\* cited by examiner

*Primary Examiner* — Edwin A Young
(74) *Attorney, Agent, or Firm* — Oblon, McClelland, Maier & Neustadt, L.L.P.

(57) ABSTRACT

A control device controls a driving force transmission device that presses a main clutch using an actuator that generates a pressing force according to a supply current. The control device includes a current command value setting unit that sets a current command value based on I-T characteristic information indicating the relationship between a current supplied to the actuator and a driving force transmitted, a correction duration setting unit that sets a correction duration based on a responsiveness related value related to the responsiveness of the main clutch when an increase in the driving force to be transmitted by the main clutch becomes greater than or equal to a threshold, a correction unit that increases and corrects the current command value for the set correction duration, and the current control unit that performs current feedback control such that a current corresponding to the current command value is supplied to the actuator.

5 Claims, 8 Drawing Sheets

(52) U.S. Cl.
CPC .............. *F16D 2500/30426* (2013.01); *F16D 2500/7061* (2013.01); *F16D 2500/70418* (2013.01)

DRIVING FORCE TRANSMISSION CONTROL APPARATUS

INCORPORATION BY REFERENCE

The disclosure of Japanese Patent Application No. 2017-171093 filed on Sep. 6, 2017 including the specification, drawings and abstract, is incorporated herein by reference in its entirety.

BACKGROUND OF THE INVENTION

1. Field of the Invention

The present invention relates to a driving force transmission control apparatus including a driving force transmission device that has a friction clutch in which friction sliding between clutch plates is facilitated by lubricating oil, and a control device that controls the driving force transmission device.

2. Description of the Related Art

There are four-wheel-drive vehicles including main drive wheels and auxiliary drive wheels and capable of switching between a two-wheel drive mode in which the driving force of a driving source is transmitted only to the main drive wheels and a four-wheel drive mode in which the driving force of the driving source is transmitted to the main drive wheels and the auxiliary drive wheels. Conventionally, such a four-wheel drive vehicle includes a driving force transmission device capable of adjusting a driving force that is transmitted to the auxiliary drive wheels. See, for example, Japanese Patent Application Publication No. 2007-64251 (JP 2007-64251 A)

A driving force transmission device disclosed in JP 2007-64251 A includes an outer case and an inner shaft that are coaxially and relatively rotatable, a main clutch unit including a plurality of inner clutch plates and a plurality of outer clutch plates disposed between the outer case and the inner shaft, a cam mechanism unit that generates a thrust force for pressing the main clutch unit through relative rotation of two cam members, and a pilot clutch unit that transmits a rotational force to one of the two cam members so as to rotate the one of the cam member relative to the other one of the cam members. The pilot clutch unit includes an electromagnetic coil to which a current is supplied from a control device, a plurality of clutch plates, and an armature facing the electromagnetic coil with the plurality of clutch plates interposed therebetween.

When a current is supplied from the control device to the electromagnetic coil, the two cam members of the cam mechanism are rotated relative to each other by a rotational force transmitted by the pilot clutch unit. The main clutch unit is pressed with a thrust force generated by the relative rotation, so that the plurality of inner clutch plates and the plurality of outer clutch plates come into frictional contact with each other. Then, a driving force is transmitted from the outer case to the inner shaft via the main clutch unit.

The control device stores I-T characteristics indicating the relationship between a current supplied to the electromagnetic coil and the magnitude of torque output from the driving force transmission device, and adjusts the current supplied to the electromagnetic coil based on the I-T characteristics so as to transmit a required driving force to the auxiliary drive wheels.

In the driving force transmission device having the configuration described above, friction sliding between the outer clutch plates and the inner clutch plates is facilitated by lubricating oil, thereby suppressing wear and heat generation. However, due to the lubricating oil existing between the outer clutch plates and the inner clutch plates, there may be a time delay from when a current is supplied to the electromagnetic coil to when the driving force transmitted to the auxiliary drive wheels rises. That is, as long as the lubricating oil existing between the outer clutch plates and the inner clutch plates is not discharged, a sufficient frictional force is not generated between the clutch plates. Accordingly, the time taken to discharge the lubricating oil causes a delay in the rise of the driving force.

SUMMARY OF THE INVENTION

An object of the present invention is to provide a driving force transmission control apparatus capable of increasing the responsiveness when increasing a driving force that is transmitted by a driving force transmission device.

According to an aspect of the present invention, there is provided a driving force transmission control apparatus including:

a driving force transmission device that transmits a driving force between an input-side rotary member and an output-side rotary member, by pressing a friction clutch using an actuator that generates a pressing force in accordance with a current supplied thereto, the friction clutch including a plurality of clutch plates between which friction sliding is facilitated by lubricating oil; and a control device that controls the driving force transmission device;

wherein the control device includes
  a current command value setting unit that sets, based on characteristic information indicating a relationship between a current supplied to the actuator and a driving force transmitted to the output-side rotary member, a current command value as a target value of the current,
  a correction duration setting unit that sets a correction duration based on a responsiveness related value related to responsiveness of the friction clutch, when an increase in a driving force to be transmitted to the output-side rotary member becomes greater than or equal to a threshold,
  a correction unit that increases and corrects a current command value set by the current command value setting unit for the correction duration, after the increase in the driving force to be transmitted to the output-side rotary member becomes greater than or equal to the threshold, and
  a current control unit that performs current feedback control such that a current corresponding to the current command value set by the current command value setting unit or corrected by the correction unit is supplied to the actuator.

With the driving force transmission control apparatus according to the above aspect, when increasing the driving force that is transmitted by the driving force transmission device, the responsiveness can be increased.

BRIEF DESCRIPTION OF THE DRAWINGS

The foregoing and further features and advantages of the invention will become apparent from the following descrip

DETAILED DESCRIPTION OF EMBODIMENTS

An embodiment of the present invention will be described with reference to FIGS. 1 to 6C.

Figure 1:
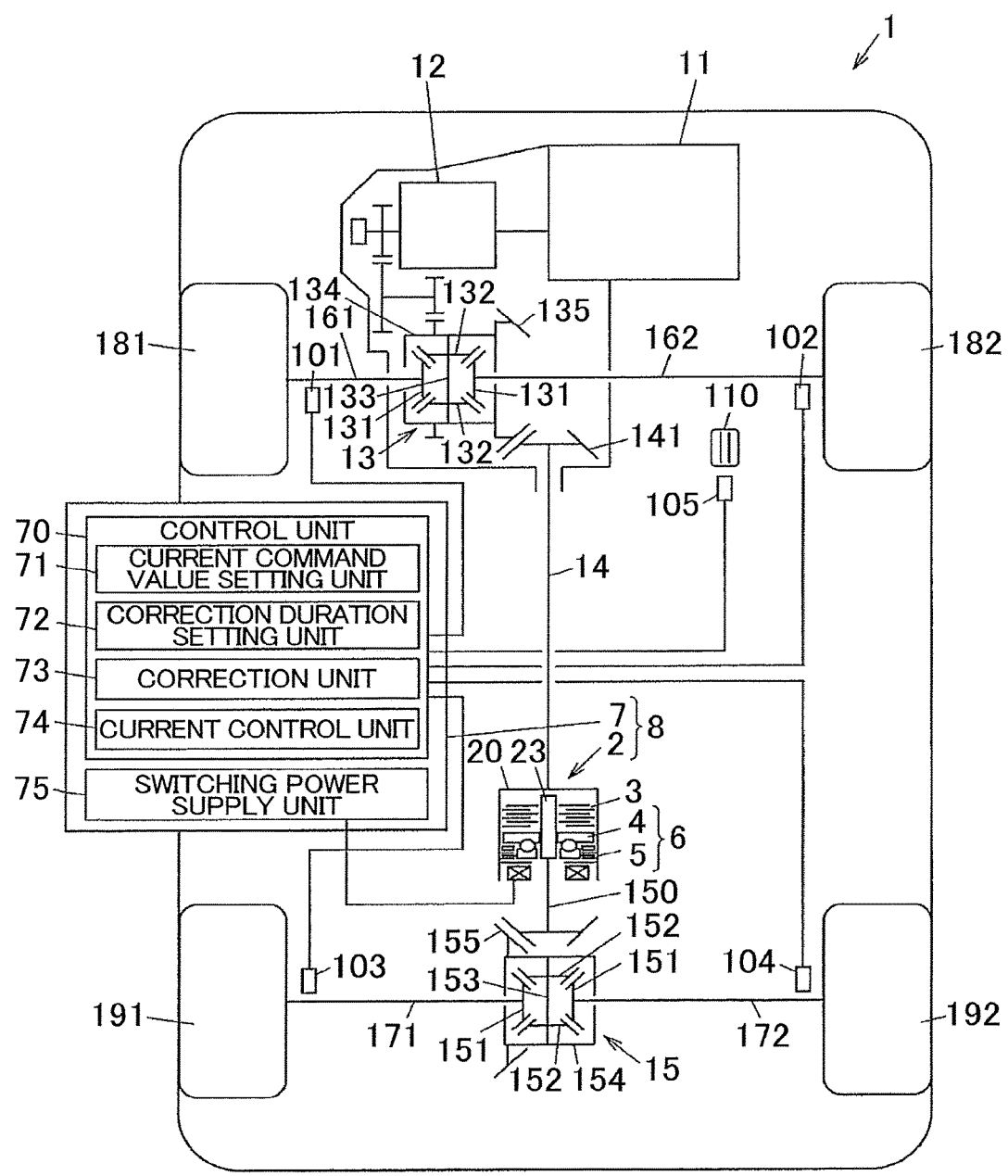
- FIG. 1 is a schematic configuration diagram illustrating an example of the configuration of a four-wheel drive vehicle including a control device for a driving force transmission device according to an embodiment of the present invention.

FIG. 1 is a schematic configuration diagram illustrating an example of the configuration of a four-wheel drive vehicle including a control device for a driving force transmission device according to an embodiment of the present invention.

As illustrated in FIG. 1, a four-wheel drive vehicle 1 includes an engine 11 serving as a driving source that generates a driving force in accordance with the operation amount of an accelerator pedal 110 (accelerator operation amount), a transmission 12 that changes the output speed of the engine 11, right and left front wheels 182 and 181 serving as main drive wheels to which the driving force of the engine 11 with a speed changed by the transmission 12 is constantly transmitted, and right and left rear wheels 192 and 191 serving as auxiliary drive wheels to which the driving force of the engine 11 is transmitted in accordance with the traveling state of the four-wheel drive vehicle 1. Wheel speed sensors 101 to 104 are provided for the right and left front wheels 182 and 181 and the right and left rear wheels 192 and 191, respectively.

The four-wheel drive vehicle 1 further includes a front differential 13, a propeller shaft 14, a rear differential 15, a pinion gear shaft 150 that transmits a driving force to the rear differential 15, right and left front-wheel drive shafts 162 and 161, right and left rear-wheel drive shafts 172 and 171, a driving force transmission device 2 disposed between the propeller shaft 14 and the pinion gear shaft 150, and a control device 7 that controls the driving force transmission device 2. The driving force transmission device 2 and the control device 7 form a driving force transmission control apparatus 8.

The driving force transmission device 2 transmits a driving force from the propeller shaft 14 to the pinion gear shaft 150, in accordance with a current supplied from the control device 7. The driving force of the engine 11 is transmitted to the right and left rear wheels 192 and 191 via the driving force transmission device 2. The control device 7 can obtain wheel speed signals detected by the wheel speed sensors 101 to 104 and indicating the rotational speeds of the right and left front wheels 182 and 181 and the right and left rear wheels 192 and 191, and an accelerator operation amount signal detected by an accelerator pedal sensor 105 and indicating the operation amount of the accelerator pedal 110. The control device 7 supplies a current to the driving force transmission device 2, thereby controlling the driving force transmission device 2. The current that is output by the control device 7 for controlling the driving force transmission device 2 is hereinafter referred to as a control current.

The driving force of the engine 11 is transmitted to the right and left front wheels 182 and 181 via the transmission 12, the front differential 13, and the right and left front-wheel drive shafts 162 and 161. The front differential 13 includes a pair of side gears 131 that are respectively coupled to the right and left front-wheel drive shafts 162 and 161 so as not to be rotatable relative thereto, a pair of pinion gears 132 that meshes with the pair of side gears 131 such that the gear axes of the pinion gears 132 are orthogonal to the gear axes of the side gears 131, a pinion gear shaft 133 supporting the pinion gears 132, and a front differential case 134 that houses these components.

A ring gear 135 is fixed to the front differential case 134. The ring gear 135 meshes with a pinion gear 141 disposed at an end of the propeller shaft 14 on the front side of the vehicle. Another end of the propeller shaft 14 on the rear side of the vehicle is coupled to a housing 20 of the driving force transmission device 2. The driving force transmission device 2 includes an inner shaft 23 disposed to be rotatable relative to the housing 20. The pinion gear shaft 150 is coupled to the inner shaft 23 so as not to be rotatable relative thereto. The driving force transmission device 2 will be described in detail below.

The rear differential 15 includes a pair of side gears 151 that are respectively coupled to the right and left rear-wheel drive shafts 172 and 171 so as not to be rotatable relative thereto, a pair of pinion gears 152 that meshes with the pair of side gears 151 such that the gear axes of the pinion gears 152 are orthogonal to the gear axes of the side gears 151, a pinion gear shaft 153 supporting the pinion gears 152, a rear differential case 154 that houses these components, and a ring gear 155 that is fixed to the rear differential case 154 and meshes with the pinion gear shaft 150.

Figure 2:
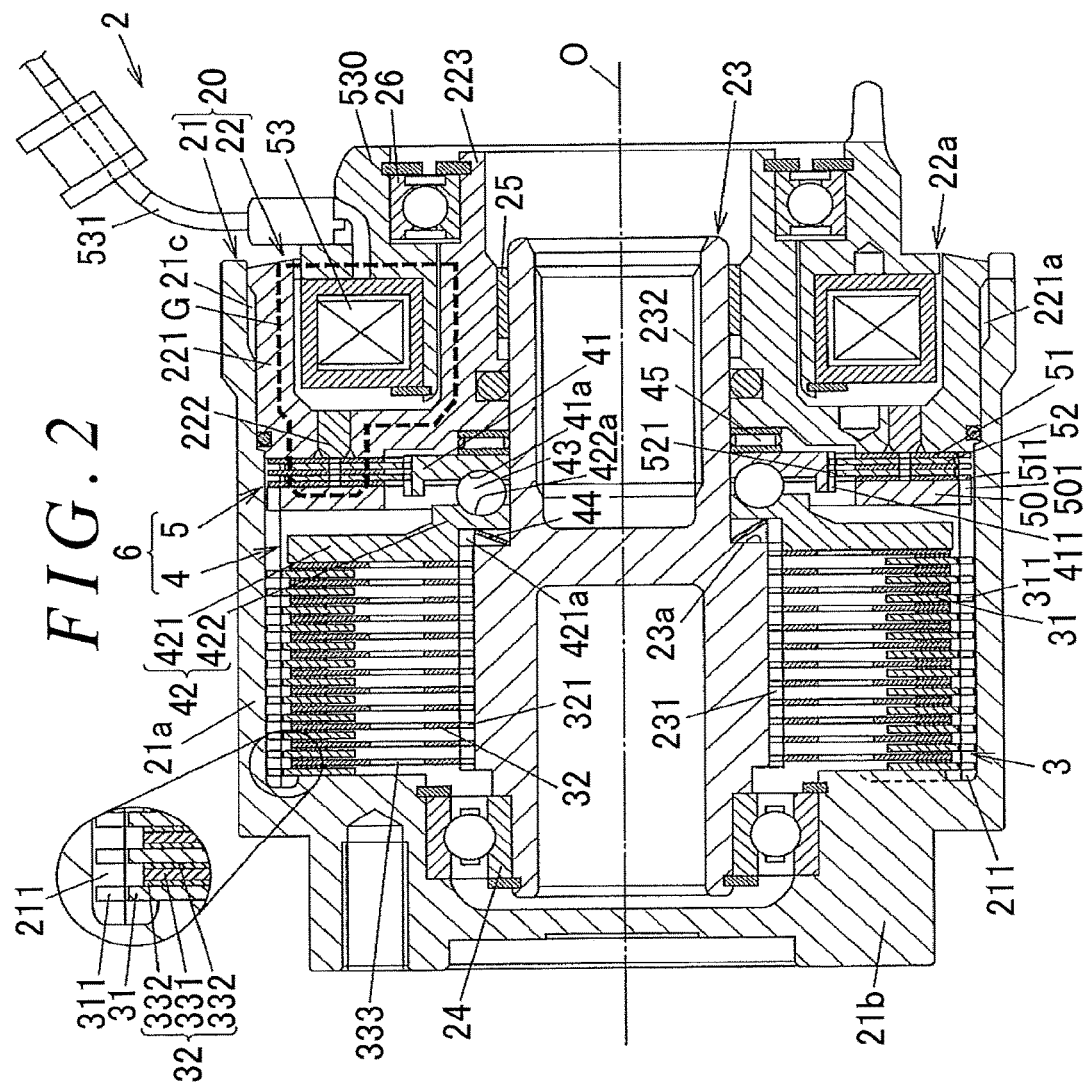
FIG. 2 is a cross-sectional view illustrating an example of the configuration of the driving force transmission device.

FIG. 2 is a cross-sectional view illustrating an example of the configuration of the driving force transmission device 2. In FIG. 2, the driving force transmission device 2 in an operating state (state in which torque is transmitted) is illustrated on the upper side of a rotation axis O, and the driving force transmission device 2 in a non-operating state (state in which torque is not transmitted) is illustrated on the lower side of the rotation axis O. Hereinafter, a direction parallel to the rotation axis O will be referred to as an axial direction.

The driving force transmission device 2 includes the housing 20 including a front housing 21 and a rear housing 22, the inner shaft 23 having a tubular shape and supported coaxially with the housing 20 so as to be rotatable relative thereto, a main clutch 3 disposed between the housing 20 and the inner shaft 23, a cam mechanism 4 that generates a thrust force for pressing the main clutch 3, and an electromagnetic clutch mechanism 5 that is supplied with a current from the control device 7 and operates the cam mechanism 4. The housing 20 is an example of an input-side rotary member of the present invention, and the inner shaft 23 is an example of an output-side rotary member of the present invention. The cam mechanism 4 and the electromagnetic clutch mechanism 5 form an actuator 6 that generates a pressing force for pressing the main clutch 3 in accordance with the current supplied from the control device 7. Lubricating oil (not illustrated) is sealed inside the housing 20.

The front housing 21 includes, as integral parts, a cylindrical tubular portion 21a and a bottom portion 21b, and thus has a bottomed cylindrical shape. The tubular portion 21a has an internal thread 21c on the inner surface at its opening end. The propeller shaft 14 (see FIG. 1) is coupled to the bottom portion 21b of the front housing 21 via, for example, a cross joint. The front housing 21 includes a plurality of outer spline projections 211 extending in the axial direction on the inner peripheral surface of the tubular portion 21a.

The rear housing 22 includes a first annular member 221 made of a magnetic martial, such as iron, a second annular member 222 that is made of a non-magnetic material, such as austenitic stainless steel, and that is joined to the inner periphery of the first annular member 221 by welding or the like, and a third annular member 223 that is made of a magnetic material, such as iron, and that is joined to the inner periphery of the second annular member 222 by welding or the like. An annular accommodation space 22a that accommodates an electromagnetic coil 53 is formed between the first annular member 221 and the third annular member 223. The first annular member 221 has, on its outer peripheral surface, an external thread 221a that is threaded in the internal thread 21c of the front housing 21.

The inner shaft 23 is supported on the inner periphery side of the housing 20 by a ball bearing 24 and a needle roller bearing 25. The inner shaft 23 includes a plurality of inner spline projections 231 extending in the axial direction on the outer peripheral surface thereof. The inner shaft 23 has, on the inner surface at an end thereof, a spline fitting portion 232 to which an end of the pinion gear shaft 150 (see FIG. 1) is fitted so as not to be rotatable relative to the inner shaft 23.

The main clutch 3 is a friction clutch of the present invention including a plurality of main outer clutch plates 31 and a plurality of main inner clutch plates 32 that are arranged alternately in the axial direction. The main outer clutch plates 31 rotate with the front housing 21, whereas the main inner clutch plates 32 rotate with the inner shaft 23. Friction sliding between the main outer clutch plates 31 and the main inner clutch plates 32 is facilitated by lubricating oil (not illustrated) sealed between the housing 20 and the inner shaft 23, thereby suppressing wear and seizure.

Each main outer clutch plate 31 is an annular disc made of metal, and has a plurality of engagement projections 311 at its outer peripheral edge. The engagement projections 311 engage with the outer spline projections 211 of the front housing 21. When the engagement projections 311 engage with the outer spline projections 211, the main outer clutch plate 31 is prevented from rotating relative to the front housing 21 while being allowed to move in the axial direction relative to the front housing 21.

Each main inner clutch plate 32 has, at its inner peripheral edge, a plurality of engagement projections 321 that engage with the inner spline projections 231 of the inner shaft 23. When the engagement projections 321 engage with the inner spline projections 231, the main inner clutch plate 32 is prevented from rotating relative to the inner shaft 23 while being allowed to move in the axial direction relative to the inner shaft 23.

Each main inner clutch plate 32 further includes an annular disc-shaped substrate 331 made of metal, and friction materials 332 attached to the opposite sides of the substrate 331. The substrate 331 has a plurality of oil holes 333 for communication of lubricating oil on the inner side with respect to the portion where the friction materials 332 are attached. Each friction material 332 is made of, for example, paper friction material or nonwoven fabric, and is attached to a portion facing the main outer clutch plate 31. Specific examples of paper wet friction materials include one obtained by making a paper body using a fiber base material such as wood pulp and aramid fiber, a friction modifier such as cashew dust or a filler including a constitutional filler such as calcium carbonate and diatomaceous earth, and a soft magnetic material, impregnating the paper body with a resin binder including a thermosetting resin, and heat curing the paper body by heat molding. Each main inner clutch plate 32 has an oil groove (not illustrated) through which the lubrication oil flows, in its contact surface with the friction material 332.

The cam mechanism 4 includes a pilot cam 41 that receives a rotational force of the housing 20 via the electromagnetic clutch mechanism 5, a main cam 42 serving as a pressing member that presses the main clutch 3 in the axial direction, and a plurality of spherical cam balls 43 disposed between the pilot cam 41 and the main cam 42.

The main cam 42 includes, as integral parts, an annular disc-shaped pressing portion 421 that contacts the main inner clutch plate 32 at one end of the main clutch 3 to press the main clutch 3, and a cam portion 422 disposed on the inner peripheral side of the main cam 42 with respect to the pressing portion 421. When a spline engagement portion 421a provided at an inner peripheral end of the pressing portion 421 engages with the inner spline projections 231 of the inner shaft 23, the main cam 42 is prevented from rotating relative to the inner shaft 23. The main cam 42 is urged away from the main clutch 3 in the axial direction by a disc spring 44 disposed between the main cam 42 and a stepped surface 23a of the inner shaft 23.

The pilot cam 41 has, at its outer peripheral edge, a spline projection 411. The spline projection 411 receives, from the electromagnetic clutch mechanism 5, a rotational force for rotating the pilot cam 41 relative to the main cam 42. A thrust needle roller bearing 45 is disposed between the pilot cam 41 and the third annular member 223 of the rear housing 22. The pilot cam 41 has a plurality of cam grooves 41a in its surface facing the cam portion 422 of the main cam 42, and the cam portion 422 of the main cam 42 has a plurality of cam grooves 422a in its surface facing the pilot cam 41. The axial depth of each of the cam grooves 41a and the cam grooves 422a varies in the circumferential direction. The cam balls 43 are disposed between the cam grooves 41a of the pilot cam 41 and the cam grooves 422a of the main cam 42.

When the pilot cam 41 rotates relative to the main cam 42, the cam mechanism 4 generates a pressing force for pressing the main clutch 3. When the main clutch 3 receives the pressing force from the cam mechanism 4, the main outer clutch plates 31 and the main inner clutch plates 32 of the main clutch 3 come into frictional contact with each other. The main clutch 3 thus transmits a driving force, by a frictional force generated between the main outer clutch plates 31 and the main inner clutch plates 32.

The electromagnetic clutch mechanism 5 includes an armature 50, a plurality of pilot outer clutch plates 51, a plurality of pilot inner clutch plates 52, and the electromagnetic coil 53. The electromagnetic coil 53 is held by an annular yoke 530 made of a magnetic material, and is accommodated in the accommodation space 22a of the rear housing 22. The yoke 530 is supported by the third annular member 223 of the rear housing 22 via a ball bearing 26. The yoke 530 has an outer peripheral surface facing an inner peripheral surface of the first annular member 221. The yoke 530 has an inner peripheral surface facing an outer peripheral surface of the third annular member 223. A control current is supplied as an excitation current from the control device 7 to the electromagnetic coil 53 via an electrical wire 531.

The plurality of pilot outer clutch plates 51 and the plurality of pilot inner clutch plates 52 are arranged alternately in the axial direction between the armature 50 and the rear housing 22. Each of the pilot outer clutch plates 51 and the pilot inner clutch plates 52 has a plurality of arc-shaped slits to prevent short-circuiting of magnetic flux generated by energization of the electromagnetic coil 53.

Each pilot outer clutch plate 51 has, at its outer peripheral edge, a plurality of engagement projections 511 that engage with the outer spline projections 211 of the front housing 21. Each pilot inner clutch plate 52 has, at its inner peripheral edge, a plurality of engagement projections 521 that engage with the spline projection 411 of the pilot cam 41. As in the case of the main clutch 3, friction sliding between the pilot outer clutch plates 51 and the pilot inner clutch plates 52 is facilitated by lubricating oil.

The armature 50 is an annular member made of a magnetic material such as iron. The armature 50 has, at its outer peripheral portion, a plurality of engagement projections 501 that engage with the outer spline projections 211 of the front housing 21. Thus, the armature 50 is allowed to move in the axial direction relative to the front housing 21 while being prevented from rotating relative to the front housing 21.

In the driving force transmission device 2 configured as described above, when a control current is supplied to the electromagnetic coil 53, magnetic flux is generated in a magnetic path G Then, the armature 50 is attracted toward the rear housing 22 by the magnetic force, so that the pilot outer clutch plates 51 and the pilot inner clutch plates 52 come into frictional contact with each other. Thus, the rotational force corresponding to the control current is transmitted to the pilot cam 41. Then, the pilot cam 41 rotates relative to the main cam 42, and the cam balls 43 roll in the cam grooves 41a and 422a. When the cam balls 43 roll, a thrust force for pressing the main clutch 3 is generated in the main cam 42, so that a frictional force is generated between the plurality of main outer clutch plates 31 and the plurality of main inner clutch plates 32. A driving force is transmitted from the propeller shaft 14 to the pinion gear shaft 150 by this frictional force.

As illustrated in FIG. 1, the control device 7 includes a control unit 70 including a CPU and a memory device, and a switching power supply unit 75 that switches a voltage of a DC power supply such as a battery and supplies a current to the electromagnetic coil 53 of the driving force transmission device 2. The switching power supply unit 75 includes a switching device such as a transistor. The switching power supply unit 75 switches a DC voltage based on a pulse width modulation (PWM) signal that is output from the control unit 70, and generates a control current to be supplied to the electromagnetic coil 53. When the CPU executes a program stored in the storage device, the control unit 70 serves as a current command value setting unit 71, a correction duration setting unit 72, a correction unit 73, and a current control unit 74.

The current command value setting unit 71 sets a current command value as a target value of a control current, based on characteristic information indicating the relationship between a control current supplied to the electromagnetic clutch mechanism 5 of the actuator 6 and a driving force transmitted from the housing 20 to the inner shaft 23. The correction duration setting unit 72 sets a correction duration based on a responsiveness related value related to the responsiveness of the main clutch 3 when the increase in the driving force to be transmitted from the housing 20 to the inner shaft 23 by the main clutch 3 becomes greater than or equal to a threshold. The correction unit 73 increases and corrects the current command value set by the current command value setting unit 71 for the correction duration set by the correction duration setting unit 72, after the increase in the driving force to be transmitted to the inner shaft 23 becomes greater than or equal to the threshold.

The current control unit 74 performs current feedback control such that a control current corresponding to the current command value set by the current command value setting unit 71 or corrected by the correction unit 73 is supplied to the actuator 6. More specifically, when the current command value set by the current command value setting unit 71 is not corrected by the correction unit 73, the current control unit 74 performs current feedback control such that a control current corresponding to the current command value set by the current command value setting unit 71 is supplied to the actuator 6. Whereas, when the current command value set by the current command value setting unit 71 is corrected by the correction unit 73, the current control unit 74 performs current feedback control such that a control current corresponding to the current command value corrected by the correction unit 73 is supplied to the actuator 6.

Figure 3:
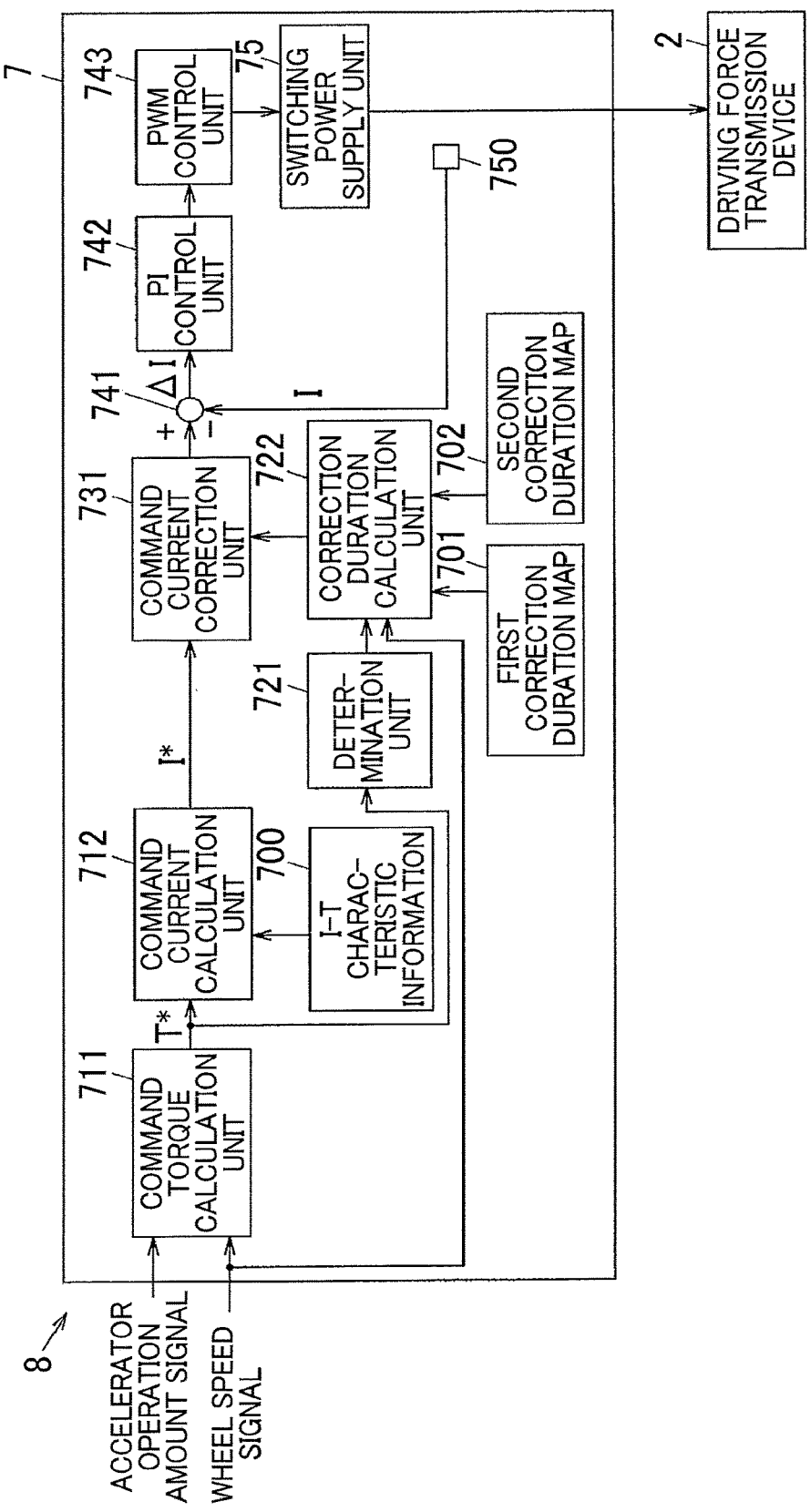
FIG. 3 is a control block diagram illustrating an example of the control configuration of the control device.

FIG. 3 is a control block diagram illustrating an example of the control configuration of the control device 7. The control unit 70 executes each process in the control block every predetermined calculation period (for example, 5 ms).

The control unit 70 causes a command torque calculation unit 711 to calculate a command torque T*, which is a driving force (target value) to be transmitted to the inner shaft 23, based on wheel speed signals of the right and left front wheels 182 and 181 and the right and left rear wheels 192 and 191 detected by the wheel speed sensors 101 to 104, and an accelerator operation amount signal detected by the accelerator pedal sensor 105. For example, the command torque calculation unit 711 sets the command torque T* to a greater value when the difference between the average rotational speed of the right and left front wheels 182 and 181 and the average rotational speed of the right and left rear wheels 192 and 191 is greater, or when the operation amount of the accelerator pedal 110 is greater. The control unit 70 also causes a command current calculation unit 712 to calculate a command current value I* corresponding to the command torque T*, based on I-T characteristic information 700 stored in the storage device. The command current value I* is a target value of the control current to be supplied to the electromagnetic coil 53.

Figure 4:
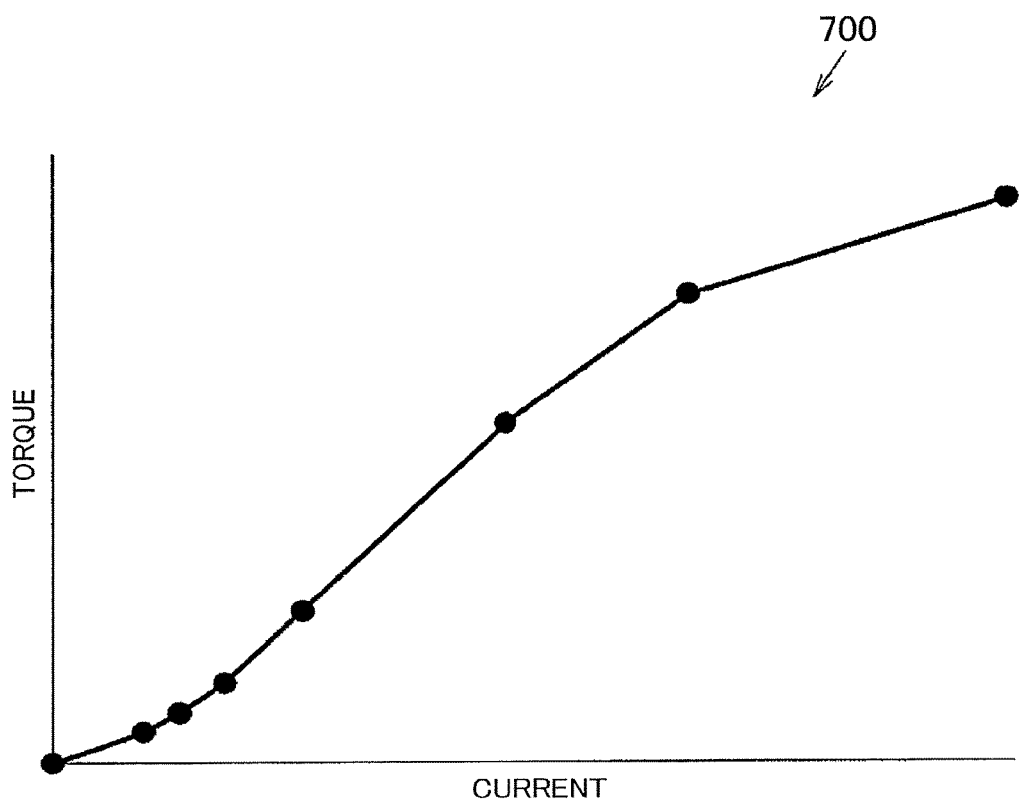
FIG. 4 is an explanatory diagram illustrating I-T characteristic information in graph form.

FIG. 4 is an explanatory diagram illustrating the I-T characteristic information 700 in graph form. The I-T characteristic information 700 indicates the relationship between the current flowing through the electromagnetic coil 53 and the driving force (torque) output to the pinion gear shaft 150, and is stored in the storage device in map form. In the I-T characteristic information 700, a plurality of coordinate points illustrated on the graph are stored in a two-dimensional coordinate system. The command current calculation unit 712 performs linear interpolation between the coordinate points, thereby calculating a command current value I* corresponding to a command torque T*. The processes executed by the command torque calculation unit 711 and the command current calculation unit 712 are the processes executed by the control unit 70 serving as the current command value setting unit 71.

When the command torque T* calculated by the command torque calculation unit 711 increases, the control unit 70 causes a determination unit 721 to determine whether the increase is greater than or equal to a threshold. The determination unit 721 makes the determination based on, for example, whether the difference between the command torque T* in the previous calculation period and the command torque T* in the current calculation period is greater than or equal to the threshold. The determination unit 721 may make the determination based on the increase in the current command value I* since the current command value I* and the command torque T* has a predetermined relationship illustrated in FIG. 4. When the determination unit 721 determines that the increase in the command torque T* is greater than or equal to the threshold, the control unit 70 causes a correction duration calculation unit 722 to calculate a correction duration based on the responsiveness related value related to the responsiveness of the main clutch 3.

In the present embodiment, the responsiveness related value includes a relative rotational speed ΔN between the housing 20 serving as an input-side rotary member and the inner shaft 23 serving as an output-side rotary member, a temperature Temp of lubricating oil, and a load amount He of the main clutch 3. However, the responsiveness related value may include only one or two of the relative rotational speed ΔN, the temperature Temp of lubricating oil, and the load amount He of the main clutch 3.

The relative rotational speed ΔN is, in other words, the rotational speed difference between the rotational speed of the main outer clutch plates 31 and the rotational speed of the main inner clutch plates 32. The relative rotational speed ΔN can be calculated as, for example, the difference between the average rotational speed of the right and left front wheels 182 and 181 and the average rotational speed of the right and left rear wheels 192 and 191. The load amount He of the main clutch 3 may be the value obtained by low-pass filtering the product of the relative rotational speed ΔN and the command torque T* with a predetermined time constant. The temperature Temp of lubricating oil is the estimated temperature of lubricating oil sealed in the housing 20, and may be calculated based on the load amount He of the main clutch 3, or may be obtained from the value detected by a temperature sensor mounted on the yoke 530. The temperature Temp of lubricating oil may be estimated by taking into consideration the ambient temperature.

The correction duration calculation unit 722 sets the correction duration longer when the relative rotational speed ΔN is lower, or when the temperature Temp of lubricating oil is lower. The reason why the correction duration calculation unit 722 sets the correction duration longer when the relative rotational speed ΔN is lower is because the lower the relative rotational speed ΔN is, the less easily the lubricating oil existing between the main outer clutch plates 31 and the main inner clutch plates 32 is discharged. The reason why the correction duration calculation unit 722 sets the correction duration longer when the temperature Temp of lubricating oil is lower is because the lower the temperature Temp of lubricating oil is, the higher the viscosity of lubricating oil is, and the less easily the lubricating oil existing between the main outer clutch plates 31 and the main inner clutch plates 32 is discharged.

When the load amount He of the main clutch 3 is less than a predetermined value, the correction duration calculation unit 722 sets the correction duration longer than when the load amount He of the main clutch 3 is greater than or equal to the predetermined value. This is because, when the load amount He of the main clutch 3 before the command torque T* is increased is greater than or equal to the predetermined value, the lubricating oil existing between the main outer clutch plates 31 and the main inner clutch plates 32 is likely to have been discharged. Next, a process of setting a correction duration executed by the correction duration calculation unit 722 will be described in greater detail with reference to FIGS. 5A and 5B.

Figure 5A:
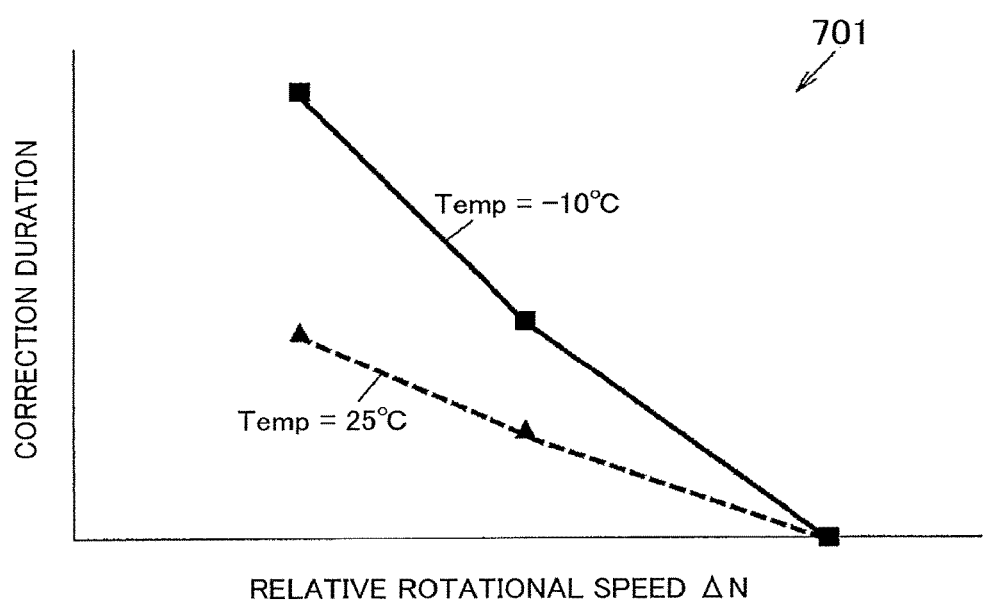
FIGS. 5A and 5B are graphs respectively illustrating an example of a first correction duration map and an example of a second correction duration map.
Figure 5B:
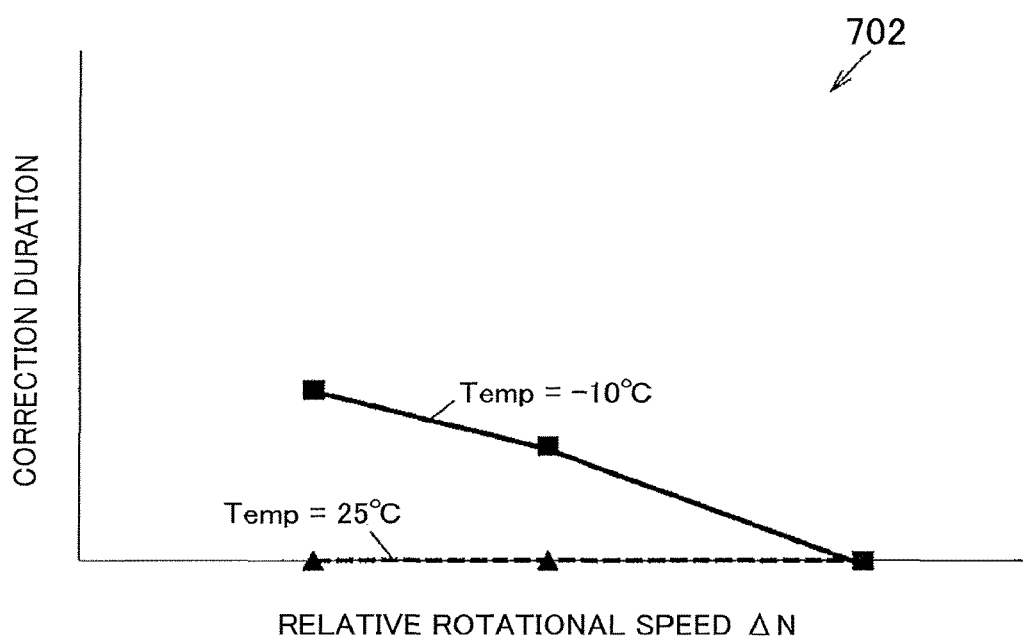

FIGS. 5A and 5B are graphs respectively illustrating an example of a first correction duration map 701 and an example of a second correction duration map 702 that are referred to by the correction duration calculation unit 722. The horizontal axis in each graph represents the relative rotational speed ΔN, and the vertical axis represents the correction duration. FIGS. 5A and 5B illustrate the relationship between the relative rotational speed ΔN and the correction duration in the case where the temperature Temp of lubricating oil is −10° C., and the case where the temperature Temp of lubricating oil is 25° C., respectively. Note that the two graphs have the same scale on each of the horizontal axis and the vertical axis.

When the load amount He of the main clutch 3 is less than a predetermined value, the correction duration calculation unit 722 refers to the first correction duration map 701. Whereas, when the load amount He of the main clutch 3 is greater than or equal to the predetermined value, the correction duration calculation unit 722 refers to the second correction duration map 702. As illustrated in FIGS. 5A and 5B, the correction duration in the first correction duration map 701 is longer than in the second correction duration map 702.

When the temperature Temp of lubricating oil is lower than or equal to −10° C., the correction duration calculation unit 722 sets the correction duration based on the map information of −10° C. indicated by continuous lines in FIGS. 5A and 5B. When the temperature Temp of lubricating oil is higher than or equal to 25° C., the correction duration calculation unit 722 sets the correction duration based on the map information of 25° C. indicated by dashed lines in FIGS. 5A and 5B. When the temperature Temp of lubricating oil is higher than −10° C. and lower than 25° C., the correction duration calculation unit 722 sets the correction duration by performing linear interpolation between the map information of −10° C. and the map information of 25° C. The maximum value of the correction duration set by the correction duration calculation unit 722 is, for example, 40 ms.

The correction duration indicates the length of the period during which a command current correction unit 731 (described below) continuously executes a process of correcting the command current value I* after the increase in the command torque T* becomes greater than or equal to a threshold. The processes executed by the determination unit 721 and the correction duration calculation unit 722 are the processes executed by the control unit 70 serving as the correction duration setting unit 72.

The control unit 70 causes the command current correction unit 731 to perform a correction that increases the command current value I* calculated by the command current calculation unit 712, for the correction duration set by the correction duration calculation unit 722. This correction processing can be performed by, for example, adding a predetermined addition value to the command current value I*. However, the present invention is not limited thereto. For example, the command current value I* may be increased and corrected by multiplying the command current value I* by a coefficient greater than 1. The process executed by the command current correction unit 731 is the process executed by the control unit 70 serving as the correction unit 73.

The control unit 70 causes a deviation calculation unit 741 to calculate a deviation ΔI between the command current value I* (the command current value I* calculated by the command current calculation unit 712 or the command current value I* calculated by the command current correction unit 731) and an actual current value I that is the value of the control current detected by a current sensor 750. Further, the control unit 70 causes a proportional-integral (PI) control unit 742 to perform a PI operation on the deviation ΔI calculated by the deviation calculation unit 741, calculate the duty ratio of a PWM signal to be output to the switching power supply unit 75 so as to bring the actual current value I closer to the command current value I*, and perform current feedback control. Further, the control unit 70 causes a PWM control unit 743 to generate a PWM signal for turning ON and OFF the switching device of the switching power supply unit 75 based on the duty ratio calculated by the PI control unit 742, and outputs the PWM signal to the switching power supply unit 75.

The processes executed by the deviation calculation unit 741, the PI control unit 742, and the PWM control unit 743 are the processes executed by the control unit 70 serving as the current control unit 74.

Figure 6A:
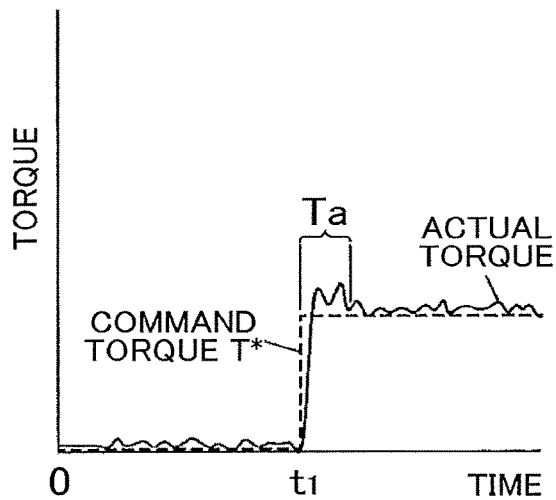
FIGS. 6A to 6C are graphs each illustrating an example of operations of the driving force transmission device controlled by the control device according to the embodiment.
Figure 6B:
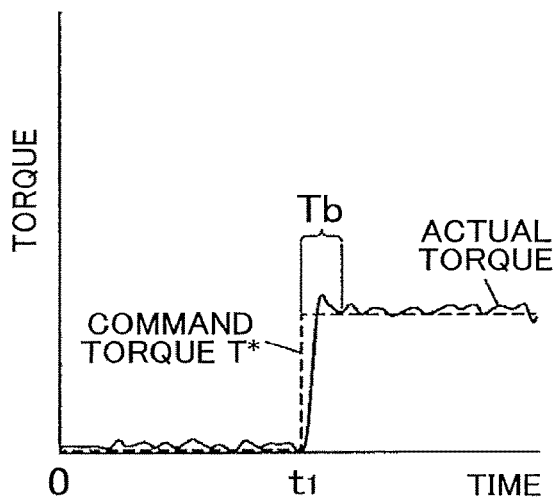
Figure 6C:
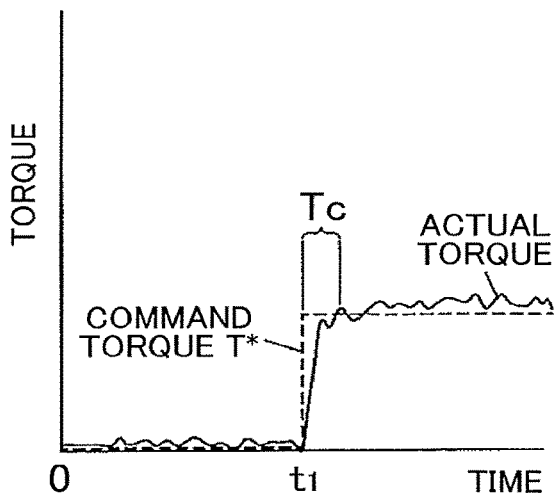
Figure 7A:
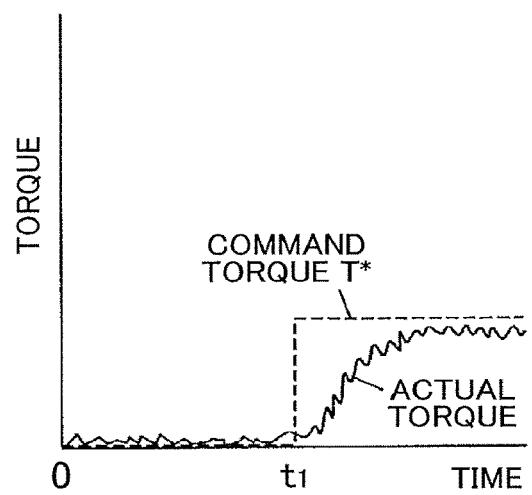
FIGS. 7A to 7C are graphs each illustrating an example of operations of the driving force transmission device in the case where a correction process is not performed by a command current correction unit according to a comparative example.
Figure 7B:
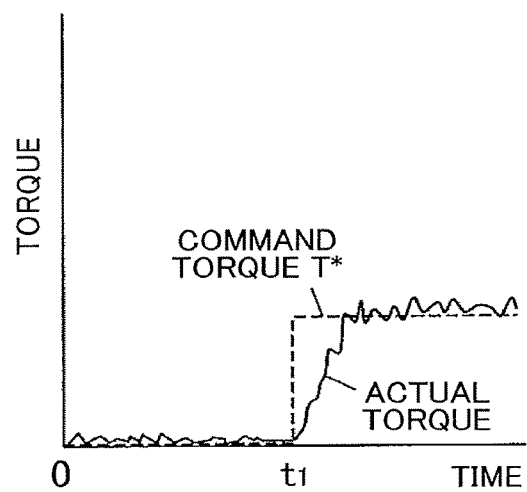
Figure 7C:
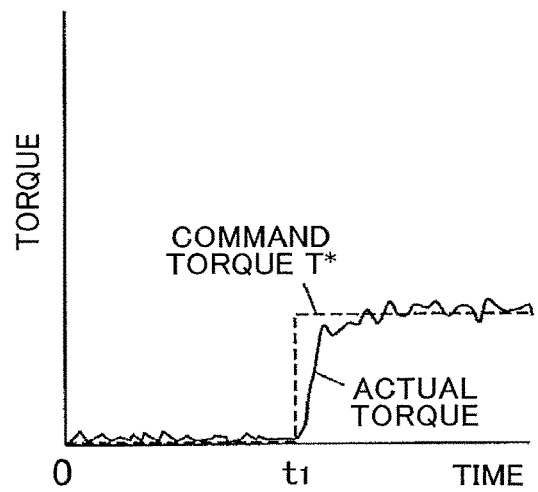

FIGS. 6A to 6C are graphs each illustrating an example of operations of the driving force transmission device 2 controlled by the control device 7 according to the present embodiment. FIGS. 7A to 7C are graphs each illustrating an example of operations of the driving force transmission device 2 in the case where a correction process is not performed by the command current correction unit 731 according to a comparative example. These graphs illustrate changes in the torque (actual torque) that is actually output from the driving force transmission device 2 when the command torque T* increases in a stepwise manner. The command torque T* is indicated by a dashed line, and the actual torque is indicated by a continuous line. FIGS. 6B and 7B illustrate changes in the actual torque to the command torque T* in the case where the relative rotational speed ΔN is less than that in FIGS. 6A and 7A. FIGS. 6C and 7C illustrate changes in the case where the relative rotational speed ΔN is less than that in FIGS. 6B and 7B.

As illustrated in FIGS. 6A to 6C, when the command torque T* increases in a stepwise manner at time t1, the command current correction unit 731 increases and corrects the command current I* for a correction duration specified for the increase in each case. In FIGS. 6A to 6C, the correction durations specified for the increase in the torque T* at time t1 are Ta, Tb, and Tc, respectively. The correction duration is the longest in the case of FIG. 6A and is the shortest in the case of FIG. 6C. Further, as is obvious from the comparison of FIGS. 6A to 6C and FIGS. 7A to 7C, when the command current correction unit 731 increases and corrects the command current I* upon an increase in the command torque T*, the actual torque rises quickly.

As described above, according to the present invention, when an increase in the command torque becomes greater than or equal to a threshold, the current command value is increased and corrected for a correction duration that is set based on the responsiveness related value related to the responsiveness of the main clutch 3. Therefore, when increasing the driving force that is transmitted by the driving force transmission device 2, the responsiveness can be increased. Accordingly, for example, when one of the right and left front wheels 182 and 181 slips while the vehicle is traveling in a two-wheel drive mode in which the driving force of the engine 11 is transmitted only to the right and left front wheels 182 and 181, the driving force can be quickly distributed to the right and left rear wheels 192 and 191, and thus the slip ends quickly. Also, for example, even when the accelerator pedal 110 is greatly depressed and the vehicle suddenly accelerates, the driving force can be quickly distributed to the right and left rear wheels 192 and 191, thereby preventing the right and left front wheels 182 and 181 from slipping.

In order to improve the responsiveness of the driving force transmission device 2, the feedback gain of the PI operation may be increased. However, if the feedback gain of the PI operation is increased, the actual torque oscillates easily. According to the present embodiment, the current command value is increased and corrected only for a correction duration after the increase in the command torque becomes greater than or equal to the threshold. Therefore, the responsiveness of the driving force transmission device 2 can be increased while suppressing oscillation of the actual torque.

What is claimed is:

1. A driving force transmission control apparatus comprising:
a driving force transmission device that transmits a driving force between an input-side rotary member and an output-side rotary member, by pressing a friction clutch using an actuator that generates a pressing force in accordance with a current supplied thereto, the friction clutch including a plurality of clutch plates between which friction sliding is facilitated by lubricating oil; and
a control device that controls the driving force transmission device;
wherein the control device includes
a current command value setting unit that sets, based on characteristic information indicating a relationship between a current supplied to the actuator and a driving force transmitted to the output-side rotary member, a current command value as a target value of the current,
a correction duration setting unit that sets a correction duration based on a responsiveness related value related to responsiveness of the friction clutch, when an increase in a driving force to be transmitted to the output-side rotary member becomes greater than or equal to a threshold,
a correction unit that increases and corrects a current command value set by the current command value setting unit for the correction duration, after the increase in the driving force to be transmitted to the output-side rotary member becomes greater than or equal to the threshold, and
a current control unit that performs current feedback control such that a current corresponding to the current command value set by the current command value setting unit or corrected by the correction unit is supplied to the actuator.

2. The driving force transmission control apparatus according to claim 1, wherein the responsiveness related value includes at least one of a relative rotational speed between the rotary members, a temperature of the lubricating oil, and a load amount of the friction clutch.

3. The driving force transmission control apparatus according to claim 2, wherein:

the responsiveness related value includes at least the relative rotational speed between the rotary members and the temperature of the lubricating oil; and the correction duration setting unit sets the correction duration longer when the relative rotational speed between the rotary members is lower, or when the temperature of the lubricating oil is lower.

4. The driving force transmission control apparatus according to claim 3, wherein:

the responsiveness related value includes the load amount of the friction clutch; and when the load amount of the friction clutch is less than a predetermined value, the correction duration setting unit sets the correction duration longer than when the load amount of the friction clutch is greater than or equal to the predetermined value.

5. The driving force transmission control apparatus according to claim 2, wherein:

the responsiveness related value includes the load amount of the friction clutch; and when the load amount of the friction clutch is less than a predetermined value, the correction duration setting unit sets the correction duration longer than when the load amount of the friction clutch is greater than or equal to the predetermined value.

\* \* \* \* \*